(12) United States Patent
McBroom et al.

(10) Patent No.: US 7,264,491 B2
(45) Date of Patent: Sep. 4, 2007

(54) METHOD AND APPARATUS FOR LINEAR INSERTION AND REMOVAL OF A MEMORY MODULE IN A COMPUTER SYSTEM

(75) Inventors: Daniel Lynn McBroom, Leonard, TX (US); Michael David McBroom, Celeste, TX (US); Brett William Degner, Menlo Park, CA (US); Brian Thomas Sudderth, Leonard, TX (US); Todd F. Gotham, Campbell, CA (US); Ethan Crumlin, Worcester, MA (US); Gavin J. Reid, Campbell, CA (US); John Ternus, Palo Alto, CA (US); Steven G. Siefert, Belmont, CA (US); Christopher Stringer, Portola Valley, CA (US); Chris Ligtenberg, San Carlos, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 11/327,571

(22) Filed: Jan. 6, 2006

(65) Prior Publication Data
US 2007/0161275 A1    Jul. 12, 2007

(51) Int. Cl.
*H01R 13/62* (2006.01)

(52) U.S. Cl. .................................... 439/160; 439/327
(58) Field of Classification Search ................ 439/135, 439/142, 145, 157, 160, 325, 327, 138, 377, 439/928.1; 361/737, 684
See application file for complete search history.

(56) References Cited

U.S. PATENT DOCUMENTS

| 5,559,672 | A | * | 9/1996 | Buras et al. ................ 361/684 |
| 5,822,183 | A | * | 10/1998 | Kanda et al. ............... 361/684 |
| 6,276,950 | B1 | * | 8/2001 | Yodogawa .................. 439/160 |
| 6,377,451 | B1 | * | 4/2002 | Furuya ....................... 361/686 |
| 6,702,598 | B1 | * | 3/2004 | Lo .............................. 439/157 |
| 6,736,660 | B2 | * | 5/2004 | Ku .............................. 439/328 |
| 6,932,633 | B2 | * | 8/2005 | Tsai ............................ 439/160 |

* cited by examiner

*Primary Examiner*—Thanh-Tam Le
(74) *Attorney, Agent, or Firm*—Sawyer Law Group LLP

(57) ABSTRACT

Methods and systems for insertion of a memory module into a computer system are provided. The method includes removing an access door of the computer system to make a connector accessible, the access door having a size substantially smaller than a footprint of the memory module, and linearly inserting the memory module into the connector.

4 Claims, 13 Drawing Sheets

METHOD AND APPARATUS FOR LINEAR INSERTION AND REMOVAL OF A MEMORY MODULE IN A COMPUTER SYSTEM

FIELD OF THE INVENTION

The present invention relates generally to computer systems, and more particularly to insertion of memory modules into computer systems.

BACKGROUND OF THE INVENTION

Random access memory (RAM) modules, for example, a dual inline memory module (DIMM), for computer systems generally come in two form factors—a large format DIMM that is generally used in desktop computers, and a small outline SO-DIMM that is generally used in laptop computers (and also in desktop computers). A large format DIMM typically has 168 pins, and a SO-DIMM typically has 72 pins or 144 pins.

Users can typically access a RAM module of a computer system, e.g., to upgrade the memory capacity of the computer system. For example, in a desktop computer, a large format DIMM is typically inserted into a receiving connector in a linear fashion—i.e., straight into the connector. However, in order to replace a memory module of a desktop computer, a user typically has to remove the outer casing (or an entire side panel) of the desktop computer to access the connector, which exposes critical components of the desktop computer to potential damage, e.g., from electrical shock. In a laptop computer (and in a desktop computer), a SO-DIMM is typically inserted into a receiving connector at an angle (e.g., on the order of 30°), and then rotated and locked into position. Such a rotational method of installation of the SO-DIMM generally requires a large opening within the computer system due to the footprint of the SO-DIMM (approximately 67.6 mm (length)×30 mm (width)).

Accordingly, what is needed is an improved system and method for inserting a memory module into a computer system. The present invention addresses such a need.

BRIEF SUMMARY OF THE INVENTION

In general, in one aspect, this specification describes a method for insertion of a memory module into a computer system. The method includes removing an access door of the computer system to make a connector accessible, the access door having a size substantially smaller than a footprint of the memory module, and linearly inserting the memory module into the connector.

Particular implementations can include one or more of the following features. Linearly inserting the memory module into the connector can include inserting the memory module into a connector having an integrated memory module ejection mechanism. The memory module can include a semicircular cutout on each side of the memory module. The integrated memory module ejection mechanism can include a catch corresponding to each semicircular cutout. Linearly inserting the memory module into the connector can include engaging each catch with respective ones of the semicircular cutouts of the memory module. The method can further include removing the memory module from the connector. The integrated memory module ejection mechanism can further include a hoop coupled to each catch. A user can remove the memory module from the connector by rotating each hoop about a pivot point thereby causing each catch to disengage the memory module through contact with the semicircular cutouts of the memory module. The integrated memory module ejection mechanism can include a lever operable to provide a mechanical advantage for removal of the memory module from the connector. The memory module can comprise a large format dual inline memory module (DIMM) or a small outline dual inline memory module (SO-DIMM).

In general, in another aspect, this specification describes an apparatus including a connector operable to linearly receive a memory module, and a memory module ejection system coupled to the connector. The memory module ejection system is operable to eject a memory module from the connector in a linear manner.

In general, in another aspect, this specification describes a system for insertion of a memory module into a computer system. The system includes means for removing an access door of the computer system to make a connector accessible, in which the access door has a width substantially smaller than a width of a footprint of the memory module. The system further includes means for linearly inserting the memory module into the connector.

Implementations may provide one or more of the following advantages. An improved system and method for linear insertion of a memory module is provided that significantly reduces the required opening within a computer system in order to insert a memory module into a connector or to remove the memory module from the connector. In one implementation, the required opening for insertion and removal of a SO-DIMM is approximately 67.6 mm (length)×3.8 mm (width). In addition, a system is provided the permits users to linearly insert a SO-DIMM without having to use a rotational method of installation. The system provides enough grip for a user to linearly insert the SO-DIMM into a connector of a computer system. In addition, a system is provided that permits a user to access a connector for a large format DIMM without having to remove an entire outer casing (or entire side panel) of a desktop computer, thereby protecting sensitive hardware within the desktop computer from potential damage.

The details of one or more implementations are set forth in the accompanying drawings and the description below. Other features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

Implementations of the present invention relates generally to computer systems, and more particularly to insertion of memory modules into computer systems. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1A:
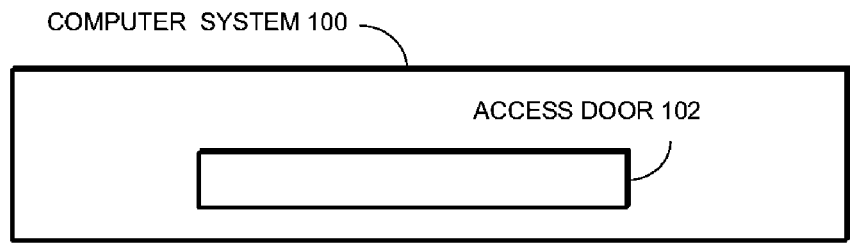
FIG. 1 is a block diagram of a computer system including an access door according to one implementation.
Figure 1B:
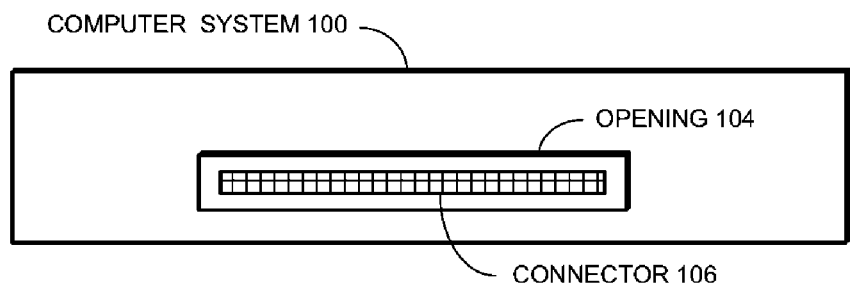

FIGS. 1A-1B illustrate a computer system 100. The computer system 100 can be any type of computer system, including for example, a workstation, a desktop computer, a laptop computer, or other system including an insertable memory module, and so on. Referring to FIG. IA, the computer system 100 includes an access door 102. In one implementation, the access door 102 can be removed to reveal an opening 104 that permits user access to a (memory) connector 106 for linear insertion and removal of a memory module (e.g., a large format DIMM or a SO-DIMM) (not shown), as shown in FIG. 1B. Because a memory module is inserted linearly into the computer system 100, the size of opening 104, therefore, can be made substantially smaller than a footprint of the memory module. More specifically, in one implementation, a width of the opening can be made just slightly larger than the memory module on-edge (e.g., a size of a conventional SO-DIMM on-edge is approximately 67.6 mm×3.8 mm). Accordingly, unlike a conventional computer system that requires that an entire outer casing (or an entire side panel) be removed, and/or that requires a rotational method of installation of a memory module, the computer system 100 permits a linear insertion (and removal) of a memory module which only requires removal of an access door that (in one implementation) is substantially a same size as a height of the memory module on-edge.

Figure 2:
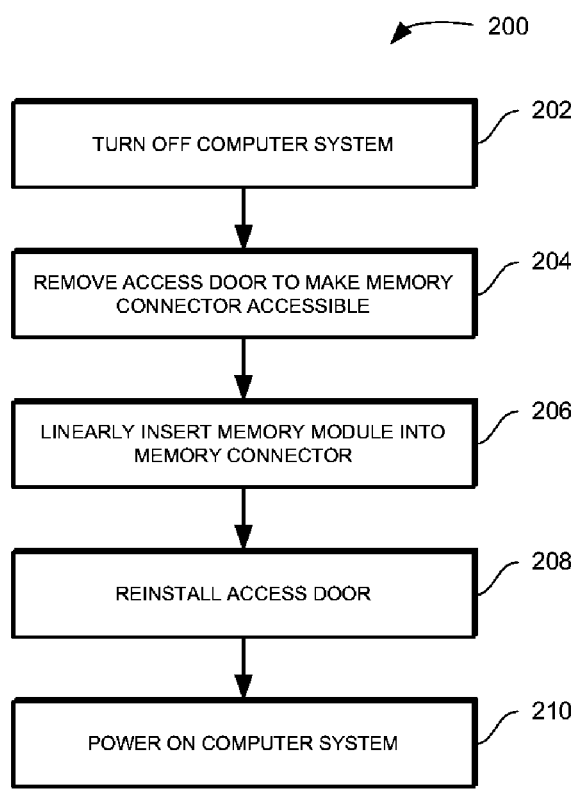
FIG. 2 is a method for inserting a memory module into the computer system of FIG. 1 according to one implementation.

FIG. 2 illustrates one implementation of a method 200 for inserting a memory module into a computer system (e.g., computer system 100 of FIG. 1). The computer system is turned off (step 202). In addition, all cables (including a power cord) can be disconnected from the computer system. An access door (e.g., access door 102) is removed to make a connector for a memory module accessible (step 204). In one implementation, the access door is removed by removing screws which hold the access door in place. Other mechanisms can be used to fasten the access door onto the computer system including, but not limited to, hinges and tabs. A memory module is linearly inserted into the connector (step 206). In one implementation, a cartridge (or carrier) holding the memory module is linearly inserted into an opening of the computer system to connect the memory module with the connector, as described in greater detail below. The access door is reinstalled (step 208). After, the access door is replaced, the computer system can be powered on (step 210).

Figure 3A:
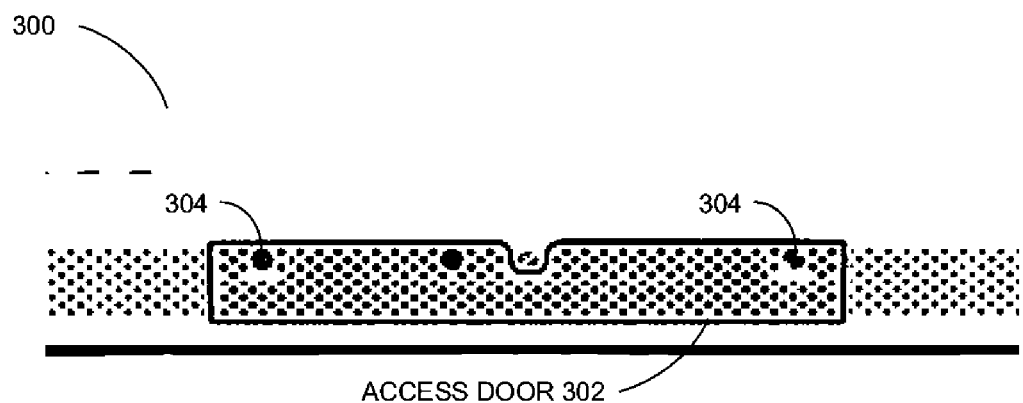
FIGS. 3A-3D illustrate a computer system including a connector having an integrated memory module ejection mechanism according to one implementation.
Figure 3B:
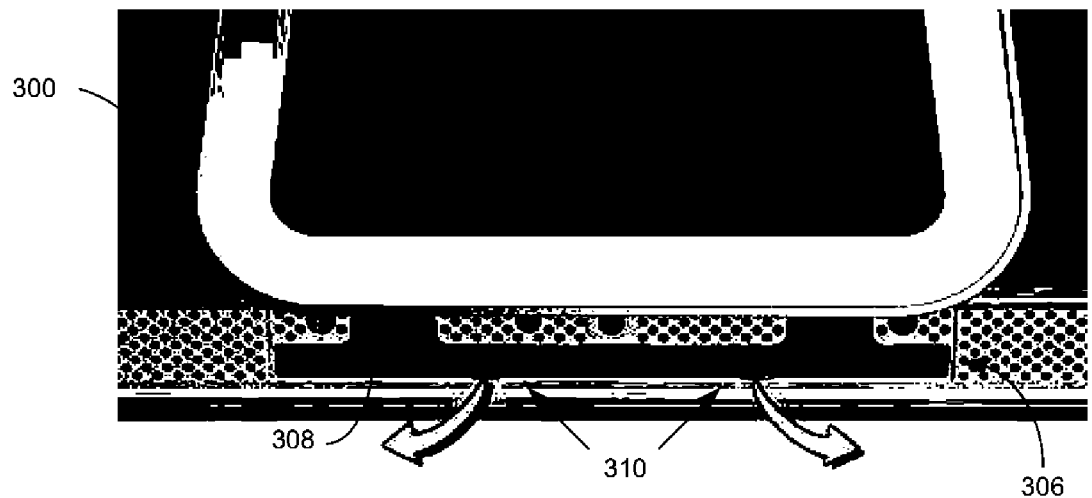
Figure 3C:
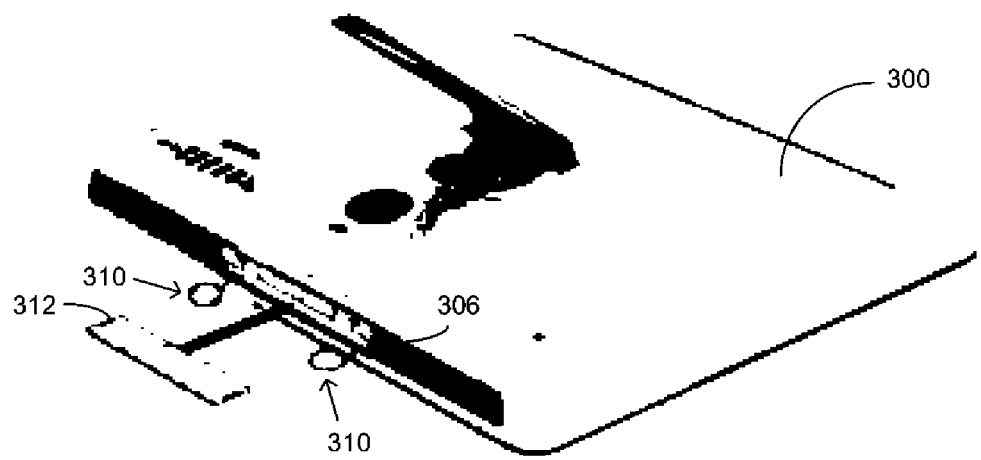
Figure 3D:
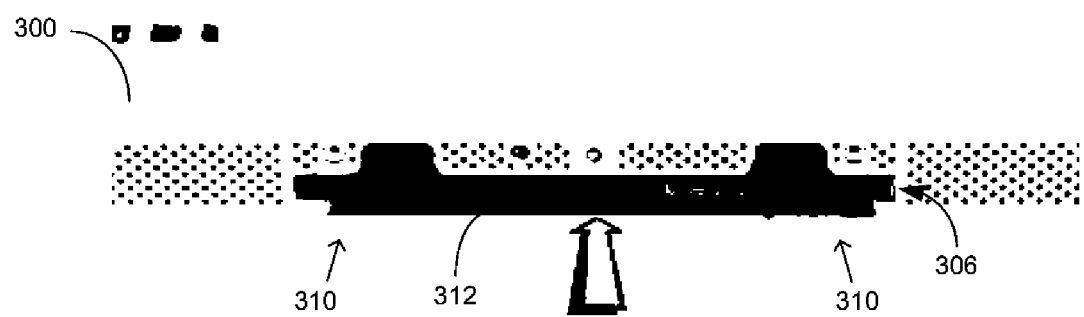

FIGS. 3A-3D illustrate a computer system 300 including a connector having an integrated memory module ejection mechanism according to one implementation. The computer system 300 can be a desktop computer system, such as an iMac computer available from Apple Computer, Inc. of Cupertino, Calif. As shown in FIG. 3A, the computer system 300 includes an access door 302 that is attached to the computer system 300 through screws 304. More generally, the access door 302 can be attached to the computer system 300 though tabs, hinges, or other suitable fastening mechanisms that are operable to fasten the access door 302 onto the computer system 300. Referring to FIG. 3B, the access door 302 can be removed to reveal an opening 304 that permits access to a connector (not shown) that includes an integrated memory ejection mechanism 308. In one implementation, the integrated memory ejection mechanism 308 include hoops 310 that can be pulled by a user to lower a memory module (e.g., a large format DIMM) from the computer system 300 (if previously installed), or to make a connector accessible. Although circular hoops are illustrated, the hoops can be in any shape, or be lever arms. Referring now to FIG. 3C, with hoops 310 extended, a memory module 312 can be aligned and linearly inserted into the opening 306, and pressed into a connector (not shown). As shown in FIG. 3D, as memory module 312 is pressed into the connector, (in one implementation) the hoops 310 also retract within the opening 306. Once then memory module 312 has been inserted into the connector, the access door 302 can be reinstalled, and the computer system 300 can be powered on.

Figure 4A:
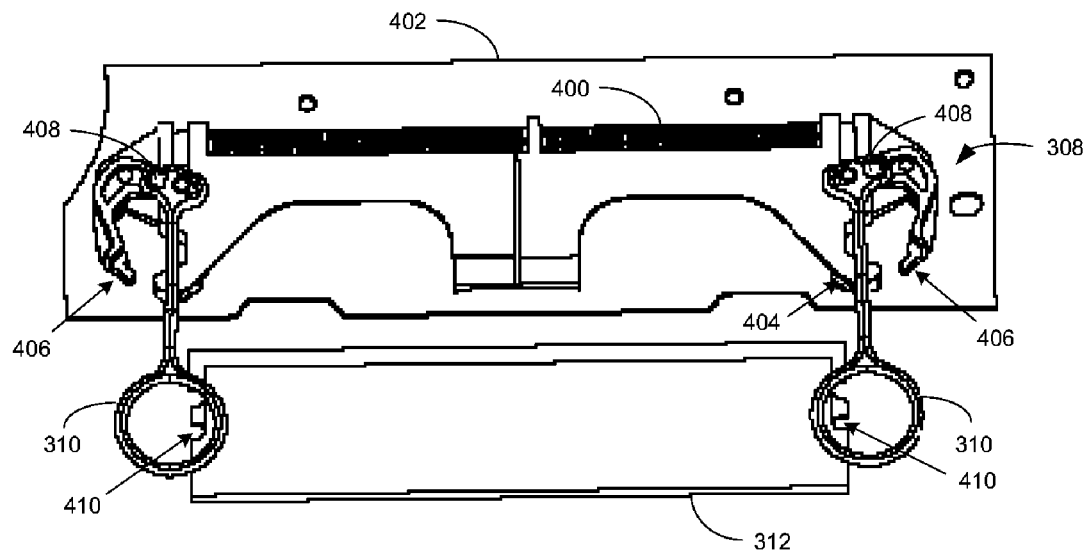
FIGS. 4A-4C illustrate schematic diagrams of the connector of FIGS. 3A-3D.
Figure 4B:
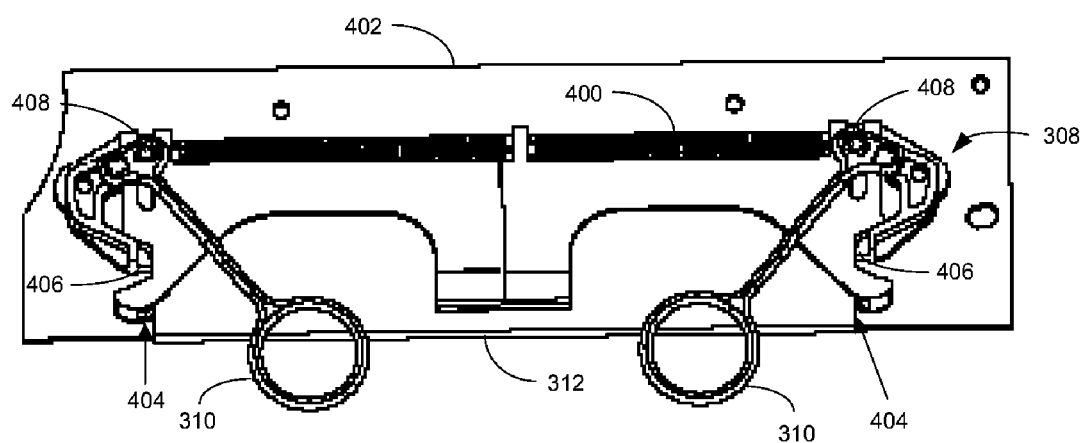
Figure 4C:
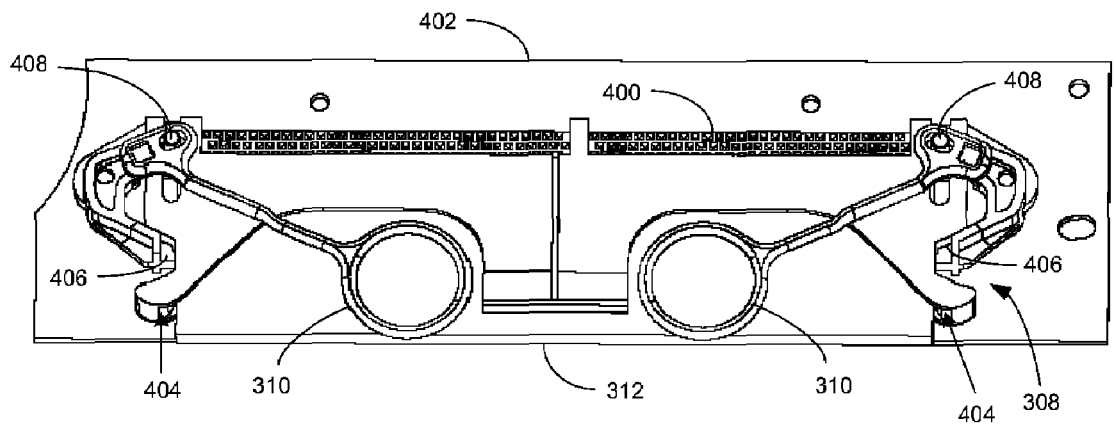

FIGS. 4A-4C show a schematic diagram of a connector 400 including the integrated memory ejection mechanism 308 (FIG. 3B) in greater detail. The main components of the connector 400 and the integrated memory ejection mechanism 308, and the operations thereof, are provided below. Referring first to FIG. 4A, in one implementation, the connector 400 and the integrated memory ejection mechanism 308 are coupled to a printed circuit board (PCB) 402. In one implementation, the integrated memory ejection mechanism 308 includes hoops 310, a sleeve 404, and catches 406 that coupled to the hoops 310. The hoops 310 and corresponding catches 406 can rotate about respective pivots 408 for installation and ejection of the memory module 312. The sleeve 404 generally provides alignment for the memory module 312 as a user inserts (or presses) the memory module 312 into the connector 400. As can be seen in FIG. 4A, the memory module 312 includes semicircular cutouts 410 on each side, as is conventional among, for example, large format DIMMs. As the memory module 312 is inserted into the sleeve 404, the catches 406 on each side of the memory module 312 catch onto and interface with the cutouts 410. According, as shown by FIGS. 4B-4C, as the memory module 312 is inserted into the sleeve 404 and into the connector 400, the hoops 310 (which are coupled to the catches 406) retract. Once inserted, the memory module 312 can be later removed by a user pulling outwardly on the hoops 310, which in turn forces the catches 406 to disengage the memory module 312 from the connector 400 through the cutouts 410. Thus, in this implementation, a user need not pull directly on a memory module to remove the memory module from a connector. Instead, a length of an arm of the hoops 310 provides a mechanical advantage for a user to remove the memory module from a high force zone associated with releasing the memory module from the connector without having the user strain to pull the memory module from the connector.

Figure 5A:
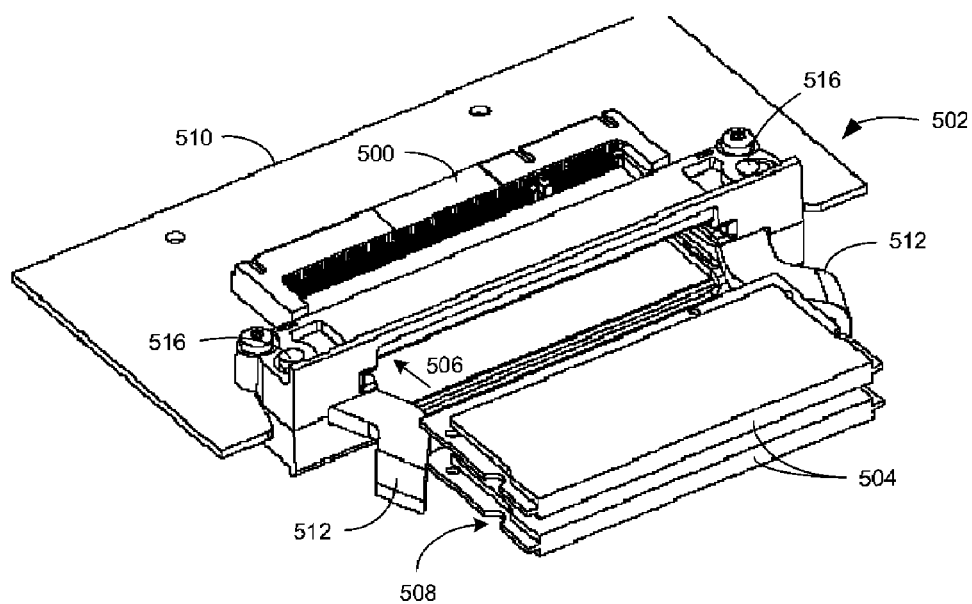
FIGS. 5A-5C illustrate a connector according to one implementation.
Figure 5B:
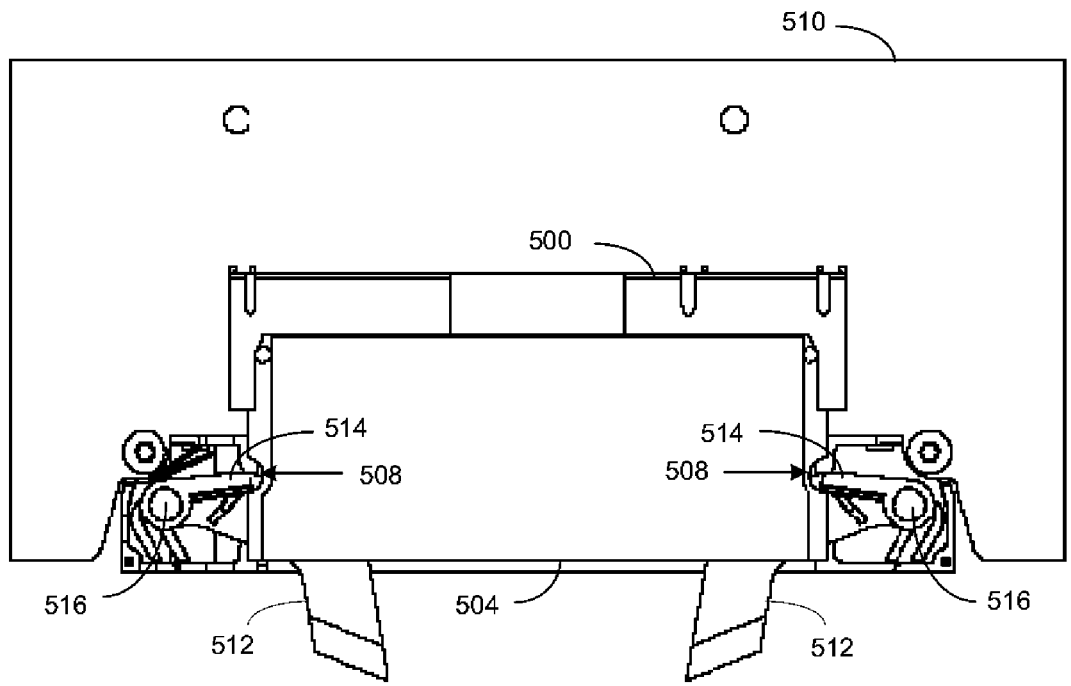
Figure 5C:
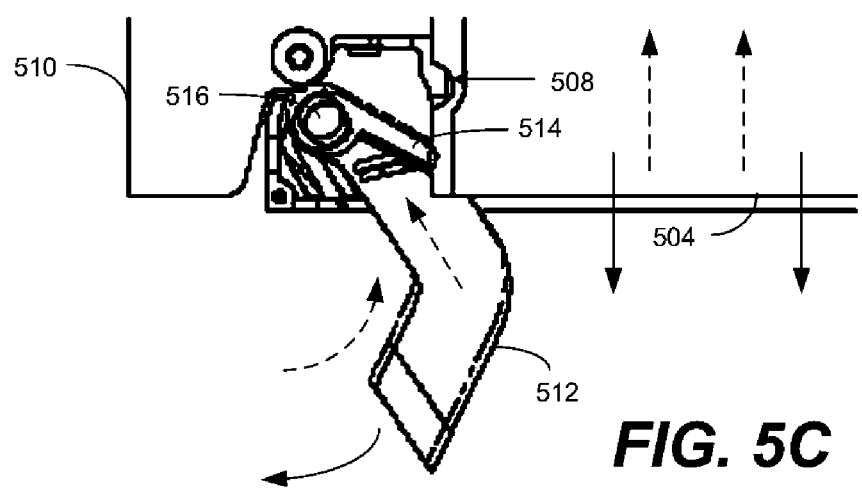

FIGS. 5A-5C illustrate two connectors 500 and a memory module ejection mechanism 502 according to one implementation. FIGS. 5A-5C illustrate a perspective view of the connectors 500 and, therefore, only one of connectors 500 is viewable. The connector 500 that is not viewable is substantially the same as the viewable connector 500. In one implementation, two SO-DIMMs 504 can be inserted simultaneously through a slot 506 and into corresponding connectors 500. As with the memory module 312 of FIGS. 4A-4C, each SO-DIMM 504 includes a semicircular cutout 508 on each side that engage a catch (or pin) associated with the memory module ejection mechanism 502 as discussed in greater detail below.

As shown in FIG. 5A, the connectors 500 and the memory module ejection mechanism 502 are coupled to a PCB 510. In one implementation, the connectors 500 are decoupled from the memory module ejection mechanism 502—i.e., the connectors 500 are not directly connected to any components of the memory module ejection mechanism 502. In one implementation, the memory module ejection mechanism 502 includes levers 512 and pins 514 (FIG. 5B) that rotate about a pivot 516. Referring now to FIG. 5B, once a SO-DIMM 504 is inserted into a corresponding connector 500, each pin 514 engages a corresponding semicircular cutout 508 of the connected SO-DIMM 504. Accordingly, to remove each SO-DIMM 504 from a corresponding memory connecter 500, a user can pull each lever 512 outwardly (as represented by the solid arrows in FIG. 5C), and pins 514 eject the SO-DIMM 504 from the corresponding connector 500 by utilizing the semicircular cutouts of the SO-DIMM 504. The levers 512 provide a mechanical advantage to release each SO-DIMM 504 from the high force zone associated with releasing each SO-DIMM 504 from the connector 500.

In one implementation, each lever 512 can also translate (or move) inwardly towards the pivot point (e.g., pivot 516) as a user closes each lever arm 512 (as represented by the dashed arrows in FIG. 5C). As shown in FIG. 5C, once a SO-DIMM 504 has been inserted into a connector, for example, by a user pressing the SO-DIMM 504 into the connector by hand, each lever 512 can be closed as follows. First, each lever arm 512 rotated until an edge of a corresponding pin 514 touches an edge of the SO-DIMM 504. When the pin 514 touches the edge of the SO-DIMM 504, a spring mechanism (not shown) permits the entire lever arm 512, including the pivot 516, to translate (or move) inwardly such that the lever arm 512 (and pin 514) pivots about one or more new points until the pin 514 reaches the semicircular cutout 508 of the SO-DIMM 514, at which point the spring mechanism causes the pin to catch and engage the semicircular cutout 508.

Figure 6A:
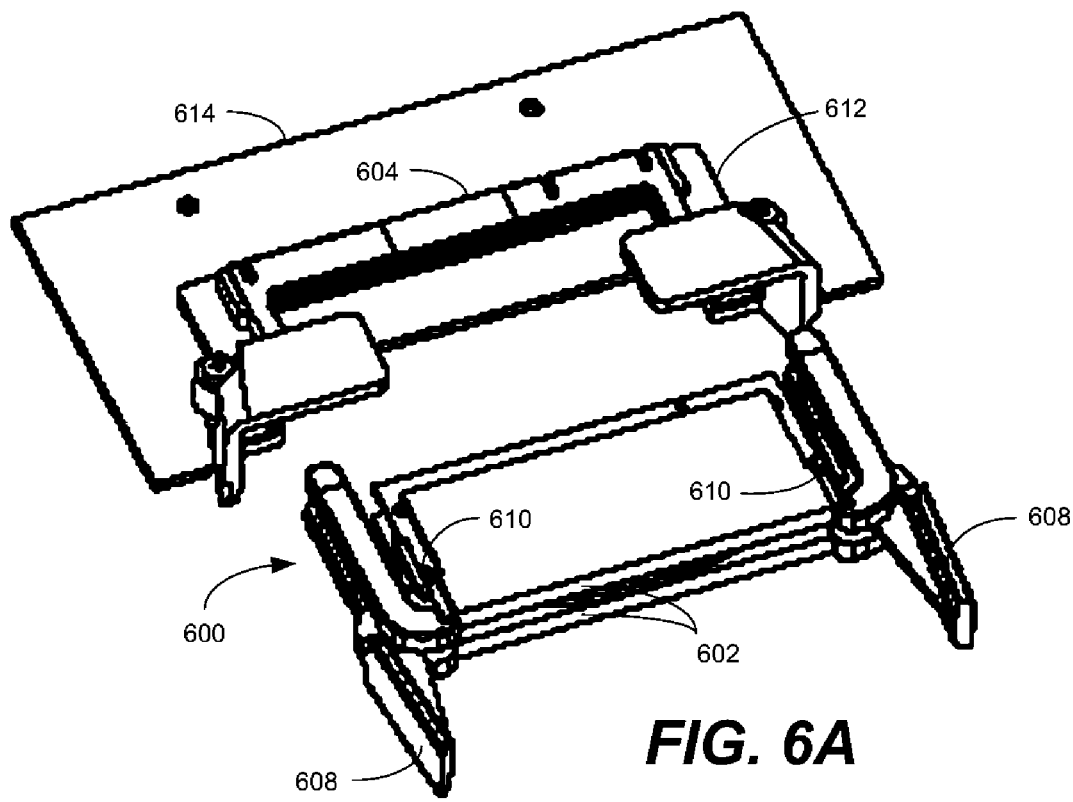
FIGS. 6A-6D illustrate a cartridge for use with insertion and removal of a memory module according to one implementation.
Figure 6B:
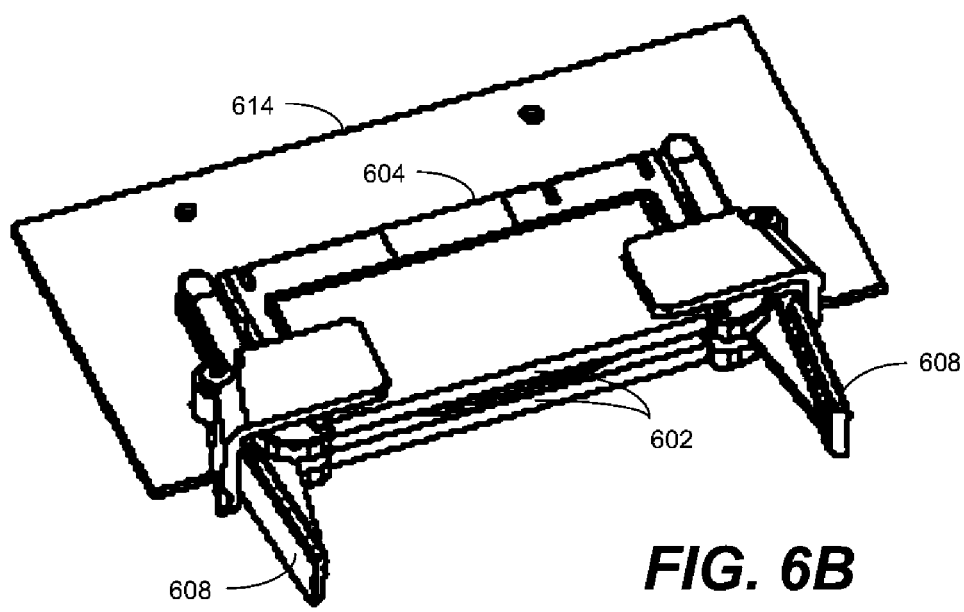
Figure 6C:
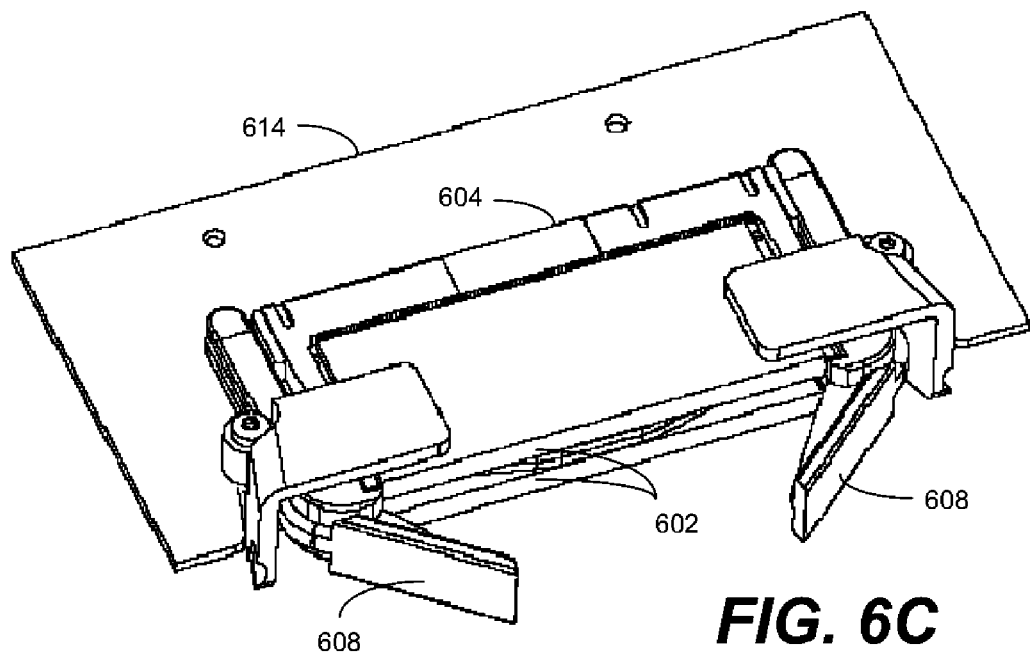
Figure 6D:
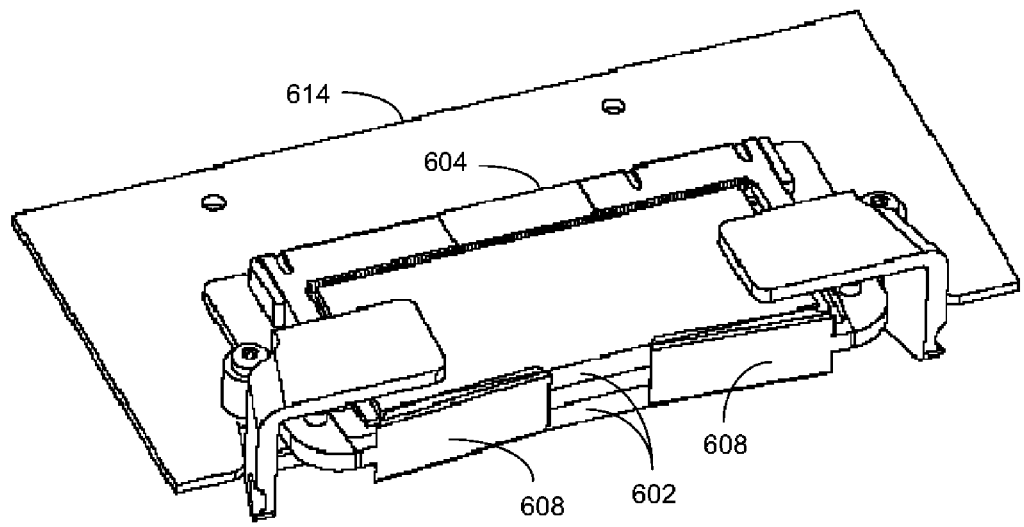

FIGS. 6A-6D illustrate a cartridge 600 for use with insertion and removal of a memory module 602 (e.g., a SO-DIMM) from a connector 604 according to one implementation. Referring to FIG. 6A, in one implementation, the cartridge 600 includes a frame 606 and lever arms 608. The frame 606 is operable to receive and hold one or more memory modules 602. In one implementation, the frame 606 includes side tabs 610 that are operable to engage a semicircular cutout of a memory module 602. Accordingly, the side tabs 610 prevent the memory module 602 from moving (or sliding) within the frame 606 while the memory module 602 is being inserted into or removed from the connector 604. As shown in FIG. 6A, the connector 604 includes a receptacle 612 to receive the cartridge 600. In one implementation, the connector 604 and the receptacle 612 are fixedly attached to a PCB 614.

Installation and removal of the memory modules 602 into a corresponding connector 614 will now be discussed. To install memory the memory modules 602 into corresponding connectors 604, a user first places each memory module 602 into the cartridge 600, and then inserts the cartridge 600 into the receptacle 612, as shown by FIGS. 6A-6D. To remove the memory modules 602 from corresponding connectors 604, a user pulls on the lever arms 606 to disengage the cartridge 600 from the receptacle 612. The lever arms 606 provide a mechanical advantage for a user to remove the memory modules 602 from the high force zone associated with releasing memory modules 602 from the connector 604. In one implementation, each lever arm 606 disengages the cartridge 600 from the receptacle 612 (and thus the memory modules 602 from corresponding connectors 604) by each lever 606 rotating a cam (not shown) that pushes against the PCB 614 (or another system component depending upon application requirements).

Figure 7A:
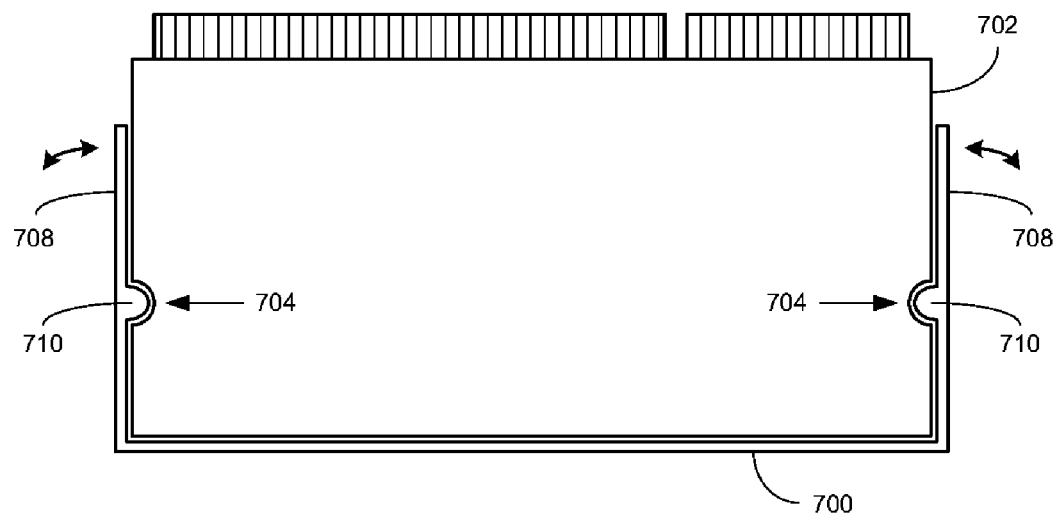
FIGS. 7A-7E illustrate a cartridge for use with insertion and removal of a memory module according to one implementation.
Figure 7B:
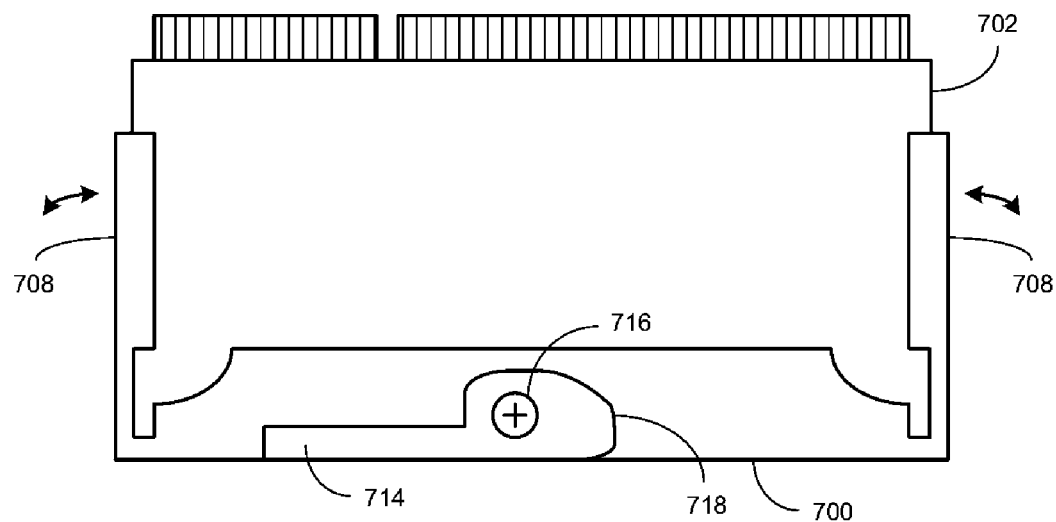
Figure 7C:
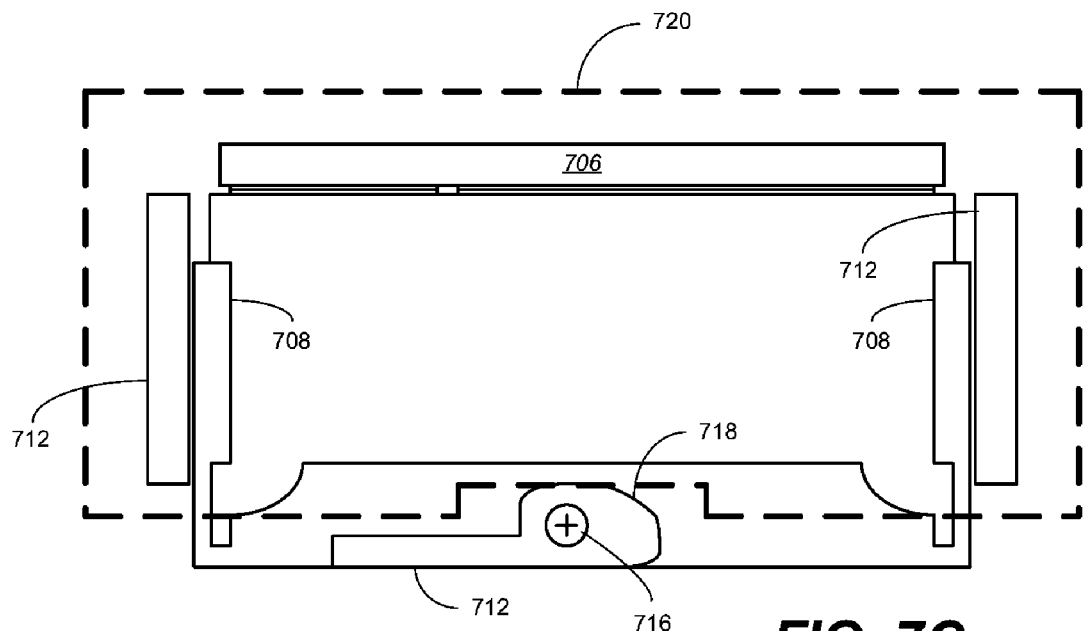
Figure 7D:
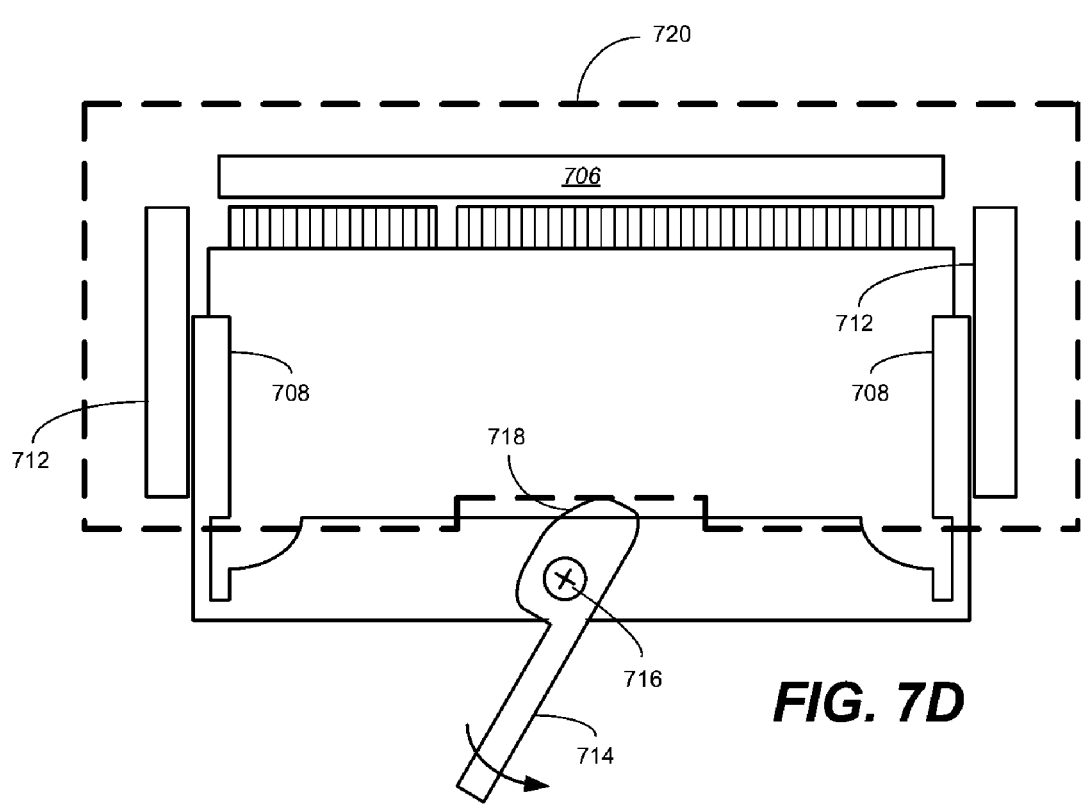

FIGS. 7A-7E illustrate a cartridge 700 (or carrier) for use with insertion and removal of a memory module 702 according to one implementation. In the implementation shown in FIGS. 7A-7E, semicircular cutouts 704 of the memory module 702 are used to eject the memory module 702 from a connector 706. In one implementation, the cartridge 700 interfaces the semicircular cutouts 704, and utilizes the semicircular cutouts 704 to pull the memory module 702 from the connector 706. In one implementation, the cartridge 700 includes two arms 708 that flex outwardly to permit a memory module to be inserted into the cartridge 700. During removal of the memory module 702 from the connector 706, as the cartridge 700 pulls on the memory module 702, there is a tendency for the arms 708 of the cartridge 700 to flex outwardly due to the engaging features (or tabs 710) acting as ramps, which would result in release of the memory module 702 from the cartridge 700. In one implementation, a receptacle for the cartridge 700 includes rails 712 (as shown in FIGS. 7C-7D) that prevent the arms 708 of the cartridge 700 from flexing outwardly and, therefore, the cartridge 700 maintains retention of the memory module 702.

More specifically, to eject the memory module 702 from the connector 706, (in one implementation) the cartridge 700 includes a lever 714 that permits a user to eject the memory module 702 past the high force zone associated with releasing memory module 702 from connector 706. In this implementation, as the user rotates the lever 714 about a pivot provided by the screw 716, the lever 714 rotates a cam 718 against a PCB 720 (or other system component) as illustrated by FIGS. 7C-7D. The cam 718 provides enough travel to disengage the memory module 702 from the electrical contacts of the connector 706. After actuating the lever 714, the cartridge 700 can be easily gripped and removed from a computer system with a low force. In one implementation, the arrangement of cam 718 ejecting the cartridge 700 against an edge of PCB 720 permits the thickness of the cartridge/memory module combination to be minimized—e.g., less than 2 mm over the combined thickness of the memory module 702 and the PCB 720. Accordingly, a height of an opening within a corresponding computer system can be minimized.

Figure 7E:
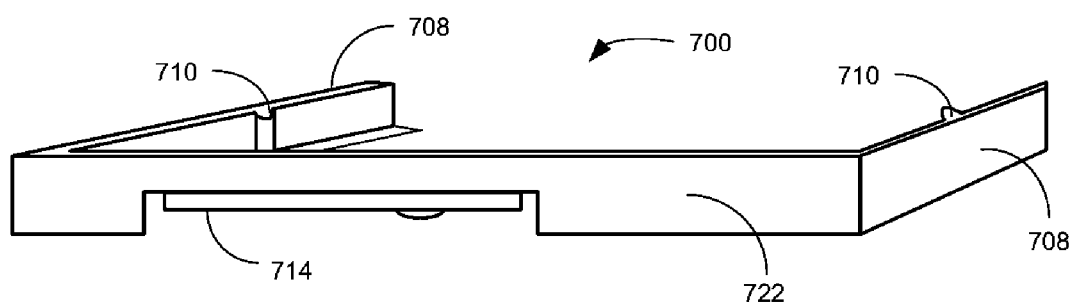

When inserting the memory module 702 into the connector 706, the user must overcome the insertion force of the connector 706. Accordingly, in one implementation, the cartridge 700 provides a large surface area 722 (as shown in FIG. 7E) for the user to push on to overcome the insertion force of the connector 706.

Figure 8A:
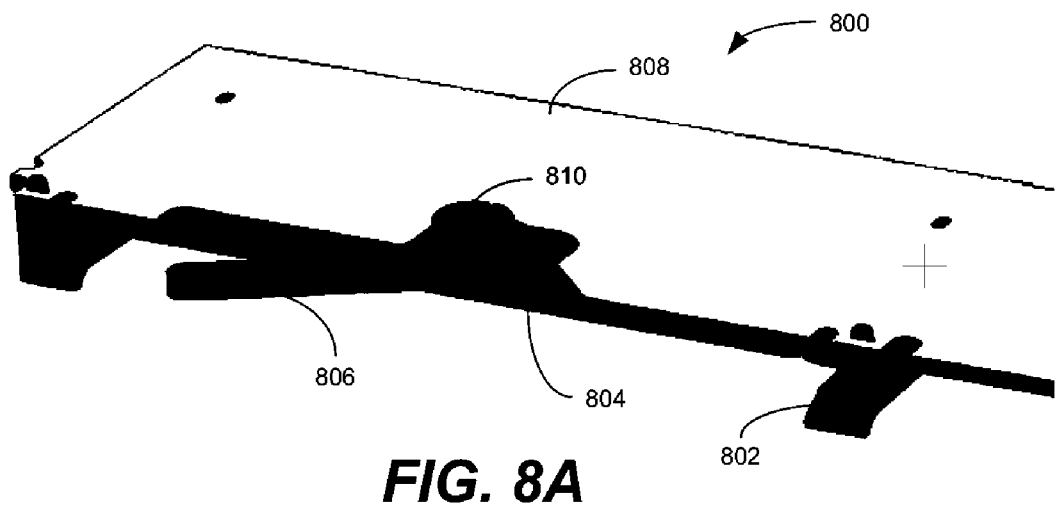
FIGS. 8A-8E illustrate a cartridgeless system for insertion and removal of a memory module according to one implementation.

FIGS. 8A-8E illustrate a cartridgeless system 800 for insertion and removal of a memory module according to one implementation. Referring first to FIG. 8A, the main components of the cartridgeless system 800 include a memory module receptacle 802 operable to receive a memory module (not shown), a slider 804, a lever 806, and a connector (not shown). In one implementation, the memory module receptacle 802 and the connector are fixedly attached to a PCB 808.

Figure 8B:
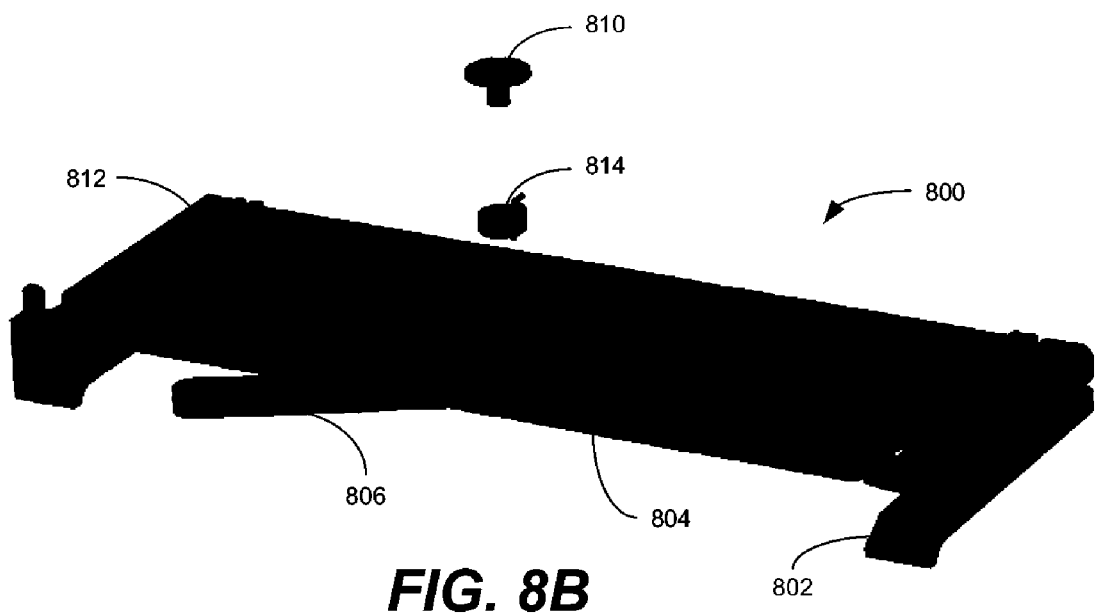
Figure 8C:
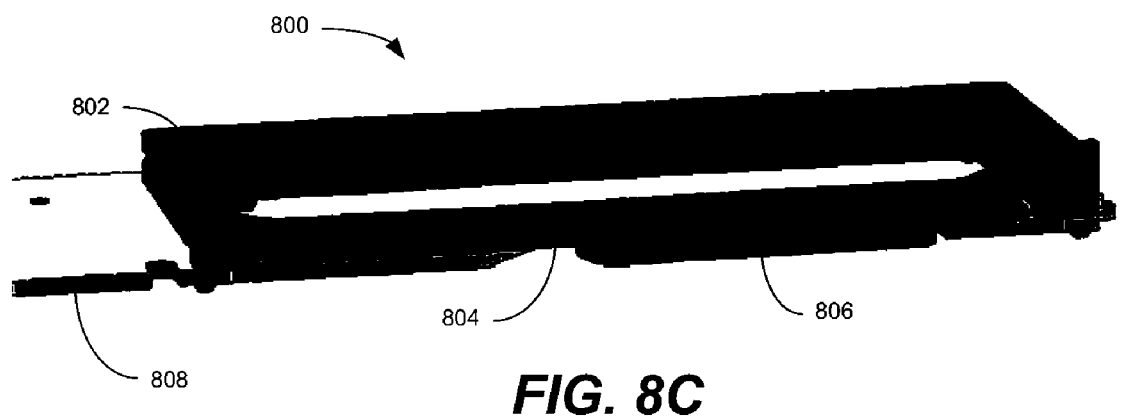
Figure 8D:
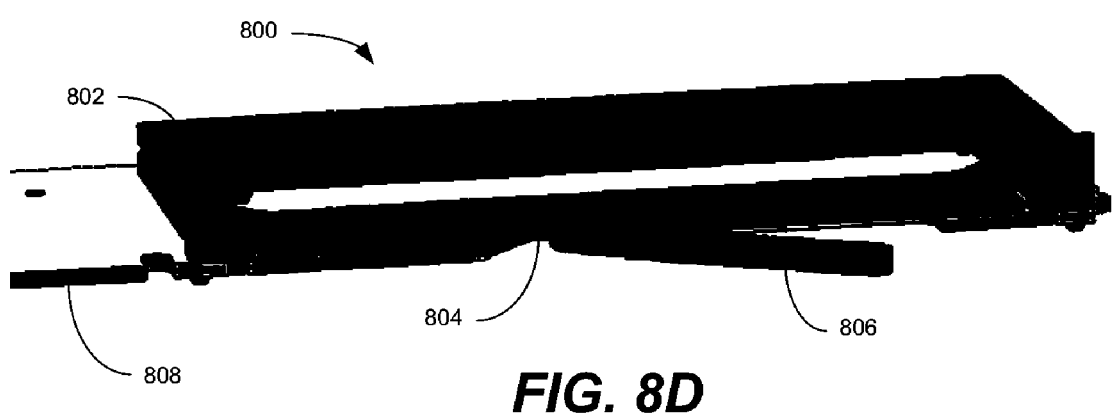
Figure 8E:
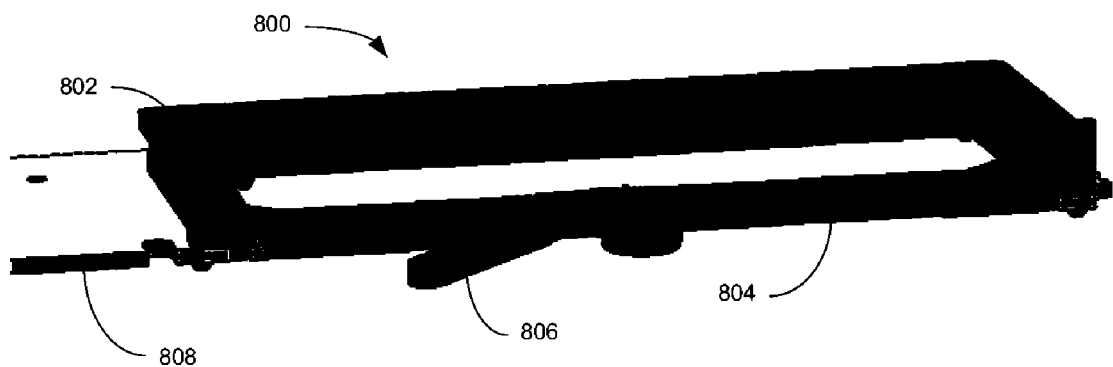

In operation, to remove a memory module from the connector, a user rotates the lever 806 about a pivot point provided by the screw 810. The lever 806 in turn rotates a cam (not shown) that pushes against the PCB 808. The force of the cam pushing against the PCB 808 causes the slider 804 to slide out in a direction away from the connector, and a kicker tab 812 (shown in FIG. 8B), that is coupled to the slider 804, pushes against an inner edge of the memory module to eject the memory module from the high force zone associated with releasing the memory module from the connector. FIGS. 8C-8E illustrate the operation of the cartridgeless system 800. As shown in FIG. 8B, in one implementation, a spring 814 is provided within the pivot point of the lever 806. The spring 814 provides a force to return the lever 806 to an initial (closed) position after having been rotated outwardly by a user.

Various implementations for inserting a memory module into (and removal of a memory module from) a connector have been described. Nevertheless, one or ordinary skill in the art will readily recognize that there that various modifications may be made to the implementations, and any variation would be within the spirit and scope of the present invention. For example, the steps of methods discussed above can be performed in a different order to achieve desirable results. In addition, the ejection mechanisms discussed above can be implemented with memories other than large format DIMMs and SO-DIMMs. Accordingly, many modifications may be made by one of ordinary skill in the art without departing from the spirit and scope of the following claims.

What is claimed is:

1. A method for insertion of a memory module into a computer system, the memory module including a semicircular cutout on each side of the memory module, the method comprising:

removing an access door of the computer system to make a connector accessible, the connector having an integrated memory module ejection mechanism, the integrated memory module ejection mechanism including a catch corresponding to each semicircular cutout, the access door having a width substantially smaller than a width of a footprint of the memory module;

linearly inserting the memory module into the connector including engaging each catch with respective ones of the semicircular cutouts of the memory module; and wherein the integrated memory module ejection mechanism further includes a hoop coupled to the each catch, wherein a user is operable to remove the memory module from the connector by rotating each hoop about a pivot point thereby causing the each catch to disengage the memory module through contact with the semicircular cutouts of the memory module.

2. The method of claim 1, further comprising removing the memory module from the connector.

3. A system for insertion of a memory module into a computer system, the memory module including a semicircular cutout means on each side of the memory module, the system comprising:

means for removing an access door of the computer system to make a connector accessible, the connector having an integrated memory module ejection mechanism, the integrated memory module ejection mechanism including a catch means corresponding to each semicircular cutout means, the access door having a width substantially smaller than a width of a footprint of the memory module; and means for linearly inserting the memory module into the connector, wherein the means for linearly inserting the memory module into the connector include means for engaging each catch means with respective ones of the semicircular cutout means of the memory module; and wherein the integrated memory module ejection mechanism further includes hoop means coupled to the each catch means, wherein a user is operable to remove the memory module from the connector by rotating each hoop means about a pivot point thereby causing the each catch means to disengage the memory module through contact with the semicircular cutout means of the memory module.

4. The system of claim 3, further comprising means for removing the memory module from the connector.

* * * * *